United States Patent [19]

Chou et al.

[11] Patent Number: 4,544,541
[45] Date of Patent: Oct. 1, 1985

[54] REMOVAL OF HEXAVALENT SELENIUM FROM NICKEL, COBALT OR COPPER SULFATE SOLUTION

[75] Inventors: Eddie C. Chou, Arvada, Colo.; Ben W. Wiegers, Wilmer, Ala.; Dale K. Huggins, Golden, Colo.; Edward I. Wiewiorowski, New Orleans, La.

[73] Assignee: AMAX Inc., Greenwich, Conn.

[21] Appl. No.: 620,670

[22] Filed: Jun. 14, 1984

[51] Int. Cl.$^4$ .............................. C01B 19/00
[52] U.S. Cl. ........................ 423/508; 423/34; 423/101; 423/140; 75/0.5 A; 75/0.5 AA; 75/108; 75/117; 75/119; 75/120; 75/121
[58] Field of Search ............ 423/508, 510, 34, 101, 423/140; 75/108, 109, 117, 119, 120, 121, 0.5 A, 0.5 AA

[56] References Cited

U.S. PATENT DOCUMENTS

| | | | |
|---|---|---|---|
| 2,111,112 | 11/1936 | Dudley | 423/510 |
| 3,933,635 | 1/1976 | Marchant | 423/510 |
| 4,026,797 | 5/1977 | Nickolic et al. | 423/510 |
| 4,089,676 | 5/1978 | Grundy | 75/108 |
| 4,096,316 | 6/1978 | Tamai et al. | 75/0.5 AA |
| 4,214,900 | 7/1980 | Crnojevich et al. | 423/510 |
| 4,405,464 | 9/1983 | Baldwin et al. | 423/510 |

Primary Examiner—John Doll
Assistant Examiner—Robert L. Stoll
Attorney, Agent, or Firm—Michael A. Ciomek; Eugene J. Kalil

[57] ABSTRACT

A process is provided for removing hexavalent selenium from an acidic sulfate solution containing at least one metal ion from the group consisting of nickel, cobalt and copper at ambient pressure and at a temperature not exceeding the boiling point of the solution. The solution is treated with an agent from the group consisting of a compound which will produce nascent hydrogen in the solution and finely divided metal from the group consisting of nickel, cobalt and copper resulting from in situ precipitation of the metal in the acid sulfate solution. Thus, following treatment with the compound, the hexavalent selenium is reduced to a form separable from the solution by solid-liquid separation.

16 Claims, 1 Drawing Figure

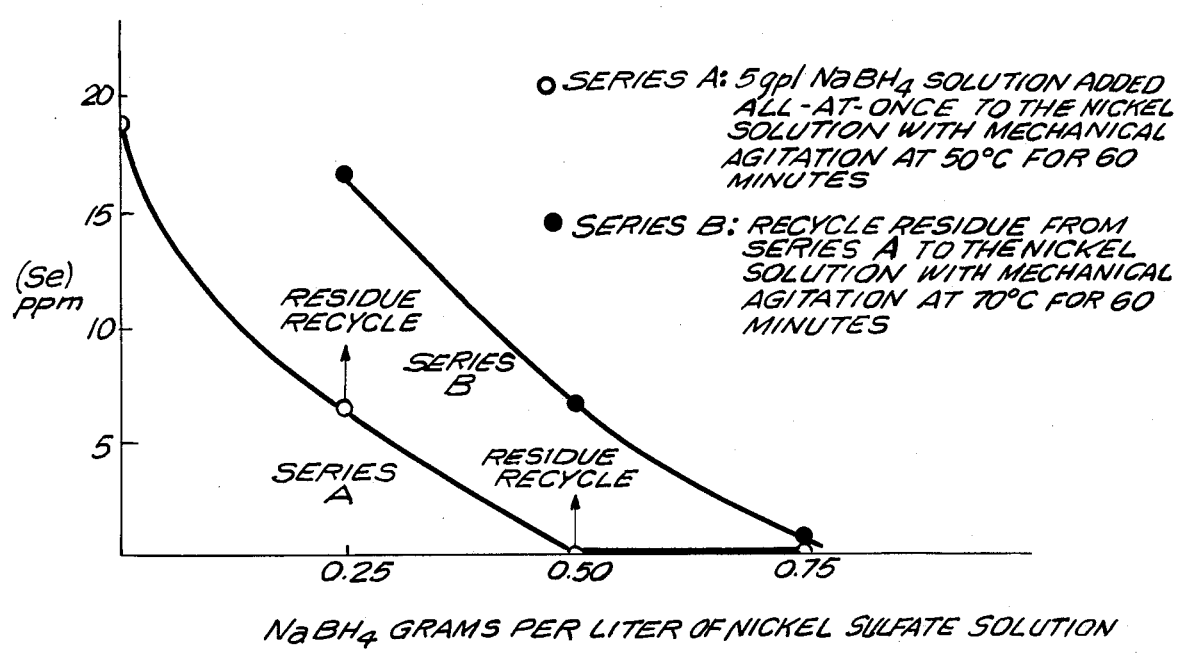

REMOVAL OF HEXAVALENT SELENIUM FROM NICKEL, COBALT OR COPPER SULFATE SOLUTION

The present invention is directed to the removal of hexavalent selenium from acidic sulfate process solutions containing nickel and/or copper ions.

BACKGROUND OF THE INVENTION AND THE PRIOR ART

Process solutions containing nickel and/or copper frequently contain selenium. Selenium is an undesirable impurity in copper since it decreases ductility and conductivity. Selenium is also undesirable in nickel for metallurgical reasons; hence, chemical specifications, particularly for melting grade nickel, severely limit the selenium content. Process solutions contemplated for treatment in accordance with the invention usually result from leaching processes wherein ores, mattes, etc. are leached with sulfuric acid.

Selenium present as Se (IV) in process solutions is readily removable therefrom at ambient temperatures and pressures using reductants such as sulfur dioxide, hydrogen, metal sulfides or metal powders such as nickel or iron powders. However, when selenium is present as Se (VI), a much more difficult problem is presented. Thus, it becomes necessary with the aforementioned reductants to resort to temperatures exceeding the boiling point of the solution; i.e., at least 110° C. and superatmospheric pressures of at least 10 psig. Resort to such temperatures and pressures greatly increases capital and operating costs in conducting the process and also greatly increases operating difficulties and tends to reduce throughput as the required autoclaves are generally operated in a batch-type manner. Safety, throughput and cost savings greatly favor operating at ambient temperatures and pressures. However, efficient Se (VI) removal is still a requirement.

SUMMARY OF THE INVENTION

Acidic nickel or copper sulfate solutions containing selenium as Se (VI) are treated with a strong reducing agent which causes the release of nascent hydrogen. During the treatment, Se (VI) is reduced to a form separable from solution by solid-liquid separation. Copper or nickel metallic powder of high surface area which is concomitantly produced by said agent in contact with the metal-containing solution is also effective to reduce Se (VI).

DESCRIPTION OF THE DRAWING

The drawing illustrates selenium removal from a nickel sulfate solution at atmospheric pressure using sodium borohydride reduction and using metallics produced by borohydride reduction in treating further portions of the same solution.

DETAILED DESCRIPTION OF THE INVENTION

In accordance with the invention nickel or copper aqueous, acidic sulfate solutions containing Se (VI) are treated at ambient pressures and at temperatures not exceeding the solution boiling point with a strong reducing agent capable of releasing nascent hydrogen. During the treatment, Se (VI) is reduced to a form separable from solution by solid-liquid separation. Reducing agents employed in accordance with the invention include metal hydrides, e.g., sodium aluminum hydride, metal borohydrides, e.g., sodium borohydride, metal borides, e.g., calcium boride, ammonia borane, hydrazine and their derivatives. Successful agents are those which will reduce ions of dissolved nickel or copper in situ to provide nickel or copper powder of high surface area. Since such metal powders are considered to have particle diameters on the order of 1 (one) micrometer ($\mu$m) or less, the surface area of such powder will be on the order of many thousands of square centimeters per gram. Such powders will also reduce Se (VI) at ambient pressures and at temperatures not exceeding the solution boiling point. It will be appreciated the powders will rapidly be oxidized if exposed to the air.

Nickel sulfate process solutions which may be treated in accordance with the invention will contain about 10 to about 200 gpl nickel, up to about 100 gpl cobalt, up to about 20 gpl iron, up to about 50 gpl copper, up to about 500 ppm zinc, up to about 500 ppm Se (VI), up to about 2,000 ppm Se (IV) and may have a pH measured at 20° C. in the range of 0 to 6.6. The solution may also contain up to about 300 gpl ammonium sulfate, and up to about 50 gpl sodium, with the remainder being water.

Copper sulfate process solutions which may be treated will contain about 10 to about 150 gpl copper, up to about 100 gpl nickel, up to about 20 gpl cobalt, up to about 500 ppm zinc, up to about 3,000 ppm iron, up to about 500 ppm Se (VI), up to about 2,000 ppm Se (IV) and may have a pH, measured at 20° C. of about 0 to about 6.6. The solutions may also contain up to about 50 gpl ammonium sulfate, and up to about 50 gpl sodium.

Agitation of the reducing agents in contact with the Se (VI)-containing solution effectively assists the removal of Se.

Some examples will now be given:

EXAMPLE 1

An aqueous nickel sulfate process solution containing about 96 gpl nickel, about 1.6 gpl cobalt, about 12 gpl $(NH_4)_2SO_4$, about 2 ppm copper, about 1 ppm iron, about 1 ppm zinc, about 16 ppm Se (VI), about 2 ppm Se (IV), with a pH at 20° C. of 6.6 was treated with sodium borohydride in water solution. One liter of the nickel sulfate solution was treated with sodium borohydride aqueous solution (10 gpl $NaBH_4$) in the ratio of one liter nickel sulfate solution to 50 milliliters of $NaBH_4$ solution. The solutions were stirred at 50° C. Table 1 presents the results:

TABLE 1

| Reaction Time, Min | Se (Total) ppm |
|---|---|
| 0 | 19.0 |
| 5 | 7.0 |
| 25 | <0.5 |

EXAMPLE 2

This example illustrates that the use of the reducing reagent directly for selenium removal can be applied to solutions having broad pH and temperature ranges. However, the effectiveness increases with solution pH. Twenty-five milliliters of a 10 gpl $NaBH_4$ solution were added to one liter of the solution described in Example 1, and the same dosage was added to another portion of the said solution after the solution pH was first adjusted from 6.6 to 3.5 with sulfuric acid. The reactions were performed in a beaker with a mechanical agitator for 60 minutes at temperatures of 40° and 70° C., with the results shown in Table 2.

TABLE 2

|  | Total Se Analyses, ppm | |
|---|---|---|
|  | pH = 3.5 | pH = 6.6 |
| Initial | 18.0 | 18.0 |
| at 40° C. | 11.5 | 4.6 |
| at 70° C. | 10.6 | 3.0 |

EXAMPLE 3

This example illustrates that the effectiveness of selenium removal when using the reducing reagent directly is also a function of the method of reagent addition and agitation.

TABLE 3

| Test A | Test B |
|---|---|
| 10 gpl NaBH4 solution added continuously Magnetic stirrer, 200 RPM pH 6.6, 50° C., 60 minutes | 5 gpl NaBH4 solution added all-at-once Mechanical agitator, 600 RPM pH 6.6, 50° C., 60 minutes |

| Grams of NaBH4 Per Liter of the | Total Se Analyses, ppm | |
|---|---|---|
| Said Solution | Test A | Test B |
| 0.0 | 19.0 | 19.0 |
| 0.25 | 9.0 | 6.3 |
| 0.50 | 3.0 | <0.5 |
| 0.75 | 0.5 | <0.5 |

EXAMPLE 4

This example illustrates the indirect method, in which sodium borohydride is added to nickel sulfate solution to precipitate a nickel-containing solid of high surface area, and the metal powder is then used to remove selenium from another sample of nickel sulfate solution having the composition set forth in Example 1. To three 200 ml samples of the nickel sulfate solutions at 70° C. (pH 6.6) were added 15 ml each of an aqueous solution containing 10 gpl NaBH4. After one hour, the solids were recovered by filtration, and the recovered solids were added to a second set of the nickel sulfate solutions at 70° C. Two solution samples in the second set had been acidified with H2SO4. After one hour at 70° C., the selenium content in the second set of samples were analyzed, with the results set forth in Table 4:

TABLE 4

| Solution pH at 20° C. | Se in the second set of Samples After Filtration, ppm |
|---|---|
| 6.5 | 12.0 |
| 3.0 | 8.0 |
| 1.0 | 4.0 |
| Untreated Feed | 18.0 |

Using sodium borohydride indirectly for selenium removal from a process stream can minimize the contamination of sodium in the process stream. In addition, the method can process lower pH solutions for selenium removal as compared to the method using sodium borohydride directly.

EXAMPLE 5

As a further comparison of the direct vs. indirect method of removing Se (VI) from a nickel sulfate solution having the composition set forth in Example 1, separate portions of the solution were treated with a 5 gpl NaBH4 solution in amounts of 0.25, 0.5 and 0.75 grams of NaBH4 per liter of nickel sulfate solution. Treatment was conducted at 50° C. for 60 minutes at pH 6.6 with mechanical agitation. Residues from each test were recycled to further portions of the same nickel sulfate solution and mechanically agitated therewith at 70° C. for 60 minutes at pH (20° C.) 6.6. Results are shown in the drawing.

The examples demonstrate the efficacy in selenium removal provided by the invention at atmospheric pressure and at temperatures below boiling. The residues produced are extremely fine and difficultly filterable. Attempts to analyze the residues by X-ray methods failed to demonstrate a crystal structure. It is nevertheless believed that the residues from treatment of nickel solutions contain nickel selenide. Reduction of the selenium content to low levels has been demonstrated even when selenium is present as Se (VI).

Experiments conducted under plant conditions in treating aqueous nickel sulfate solutions containing selenium (VI) have demonstrated a number of requirements in relation to continuous treatment, as follows:

1. Aqueous solutions of a strong reducing agent such as sodium borohydride (NaBH4) are unstable. This instability is accelerated by the presence of nickel. Solutions should be made up to a concentration of about 60 to about 250 gpl and a stabilizer such as sodium hydroxide in amount of about 25 gpl or ammonia in amount of about 70 gpl. Such solutions will retain more than 90% of the NaBH4 content after 24 hours.

2. The best available mixing technique, e.g., an in-line mixer, should be used in introducing the borohydride solution into the selenium (VI)-containing nickel or copper sulfate stream to be treated.

3. When sodium borohydride is directly added, the pH of the nickel or copper sulfate stream preferably should be above 5.0, e.g., about 5.5 to 6.6.

4. The concentrated sodium borohydride makeup solution should be diluted with water and with high agitation and sodium borohydride should be injected into the nickel or copper sulfate stream at a dosage of at least about 0.15 grams per liter of the sulfate stream, with a concentration of sodium borohydride in the diluted solution of about 12.5 to about 25 grams per liter.

EXAMPLE 6—EFFECT OF DOSAGE

A nickel stream containing 11 ppm Se, 107 gpl Ni, 9 ppm Cu, 95 ppm Fe, at a pH of 5.6 and a temperature of 70° C. was treated with a sodium borohydride solution having a makeup concentration of 250 gpl NaBH4 and 25 gpl NaOH. A 6-element mixer was used in a 1-inch pipe wherein the flow rate of the nickel sulfate solution was 16 gallons per minute. Dilutions of 5 and 20 times with water were used to prepare the NaBH4 solution for infection which was accomplished by means of a positive displacement pump. The mixed solutions were then led to a one liter agitated batch reactor. Results are shown in Table 5.

TABLE 5

| | | Selenium Conc. (ppm Se) | | | |
|---|---|---|---|---|---|
| | | Dilution (Times) | | | |
| | | 5 | | 20 | |
| | | NaBH$_4$ Conc. at Inject. Pt. | | | |
| Borohydride Dosage | | 50 | | 12.5 | |
| | Dosage | Retention Time | | | |
| Addition | lbs NaBH$_4$ | 1 | | 1 | |
| gpl NaBH$_4$ | lb Se | Min. | 30 Min. | Min. | 30 Min. |
| 0.05 | 4.5 | 8.4 | 7.0 | 8.2 | 6.8 |
| 0.075 | 6.8 | — | — | 6.8 | 4.0 |
| 0.10 | 9.1 | 6.4 | 3.2 | 5.8 | 3.2 |
| 0.125 | 11.4 | — | — | 3.4 | 0.6 |
| 0.15 | 13.6 | 3.0 | 0.2 | 2.6 | 0.2 |
| 0.175 | 15.9 | — | — | 1.8 | 0.2 |
| 0.20 | 18.2 | 2.8 | 0.2 | 1.8 | 0.2 |

The results of both test series indicate that an addition of 0.15 gpl NaBH$_4$ per liter of nickel solution is required for selenium control.

A dilution of 10 to 20 times, corresponding to a borohydride concentration of 12.5 to 25 gpl NaBH$_4$ at the injection point, was found to be adequate.

EXAMPLE 7—KINETIC STUDIES

Conditions and results are set forth as follows in Table 6.

TABLE 6

| Nickel Stream: | 11 ppm Se, 107 gpl Ni, 9 ppm Cu, 95 ppm Fe, pH 5.6, 70° C. |
|---|---|
| Blending: | 6 Element Mixer, Flow Rate 16 gpm |
| NaBH$_4$ Makeup: | 250 gpl NaBH$_4$, 25 gpl NaOH |
| Dilution 20X, Borohydride Conc. at Injection, 12.5 gpl NaBH$_4$ | |

| Test Conditions Dosage | | Residual Selenium Conc. (ppm Se) (Conversion %) | | | | |
|---|---|---|---|---|---|---|
| | | Retention Time (Min.) | | | | |
| gpl NaBH$_4$ | lb. Se | 1 | 15 | 30 | 60 | 120 |
| 0.1 | 9.1 | 5.8 | 2.8 | 3.2 | 3.2 | 3.2 |
| | | (47) | (74) | (71) | (71) | (71) |
| 0.15 | 13.6 | 3.0 | 0.6 | 0.2 | 0.2 | 0.2 |
| | | (73) | (94) | (98) | (98) | (98) |

Both test series indicate that an equilibrium is reached in about 30 minutes. An addition of 0.1 gpl NaBH$_4$ is insufficient even when longer retention time is provided. An addition of 0.15 gpl NaBH$_4$ was operative.

EXAMPLE 8—EFFECT OF DILUTION

The blending effect can be aided by proper dilution of the borohydride makeup solution prior to injection. The results of the test series with various dilutions of up to 30 times with concentrations of borohydride between 8 and 250 gpl NaBH$_4$ at the injection point are presented in Table 7.

TABLE 7

| Nickel Stream: | 11 ppm Se, 107 gpl Ni, 9 ppm Cu, 95 ppm Fe, pH 5.6, 70° C. |
|---|---|
| Blending: | 6 Element Mixer, Flow Rate 16 gpm |
| NaBH$_4$ Makeup: | 250 gpl NaBH$_4$ |
| NaBH$_4$ Dosage: | 0.15 gpl NaBH$_4$ |

| Dilution | | Selenium Concentration ppm Se | |
|---|---|---|---|
| | Conc. of NaBH$_4$ at Injection Point | | |
| Times | gpl NaBH$_4$ | 1 Min. | 30 Min. |
| 0 | 250 | 7.6 | 4.4 |
| 3 | 83 | 3.6 | 1.0 |
| 5 | 50 | 3.4 | 0.6 |
| 10 | 25 | 3.2 | <0.2 |
| 20 | 12.5 | 3.0 | <0.2 |
| 30 | 8.3 | 2.2 | <0.2 |

EXAMPLE 9—INTERACTION OF DILUTION AND AGITATION

There is a strong interaction between dilution and agitation as shown in Table 7, where three different levels of agitation were achieved by changing the number of elements and changing the nickel stream flow rate and three levels of dilution up to 40 times were employed.

TABLE 8

| Nickel Stream: | 11 ppm Se, 102 gpl Ni, 9 ppm Cu, 40 ppm Fe, pH 5.5, 68° C. |
|---|---|
| NaBH$_4$ Makeup: | 250 gpl NaBH$_4$, 25 gpl NaOH |
| NaBH$_4$ Dosage: | 0.2 gpl NaBH$_4$ |

| | | Residual Selenium (ppm) (1 min. Ret. Time) | | |
|---|---|---|---|---|
| | | No. of Elements in Mixer | | |
| Dilution | | 0 | | 6 |
| Times | gpl NaBH$_4$ at Injection | NiSO$_4$ Flow Rate (gpm) | | |
| | | 5 | 20 | 20 |
| 0 | 200 | 8.7 | 5.0 | 3.0 |
| 10 | 25 | 7.0 | 1.9 | 0.9 |
| 40 | 6.4 | 1.1 | 0.6 | <0.2 |

While the invention has been described hereinbefore in relation to the removal of selenium (VI) from nickel and copper sulfate solutions, it is found that the invention is also applicable to the treatment of cobalt sulfate solutions. Cobalt sulfate process solutions, which may be treated in accordance with the invention, will contain about 10 to about 200 g/L cobalt, up to about 100 g/L nickel, up to about 20 g/L iron, up to about 50 g/L copper, up to about 500 ppm zinc, up to about 500 ppm Se (VI), up to about 2,000 ppm Se (IV), and may have a pH measured at 20° C. in the range of 0 to 6.6. The solution may also contain up to about 300 g/L ammonium sulfate and up to about 50 g/L sodium, with the remainder being water.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. The process for removing hexavalent selenium from an acidic sulfate process solution containing the same and at least one metal ion from the group consisting of nickel, cobalt and copper at ambient pressure and at a temperature not exceeding the boiling point of said solution which comprises treating said solution with an effective amount of an agent from the group consisting of metal hydrides, metal borohydrides, ammonia borane, and their derivatives and finely divided metal from the group consisting of nickel, cobalt and copper resulting from in situ precipitation of said metal in an acid sulfate solution thereof upon treatment with said compound, to reduce said hexavalent selenium to a form separable from said solution by solid-liquid separation.

2. The process in accordance with claim 1 wherein said compound is sodium borohydride.

3. The process in accordance with claim 1 wherein said compound is sodium aluminum hydride.

4. The process in accordance with claim 1 wherein said acidic sulfate solution is a nickel sulfate solution.

5. The process for removing hexavalent selenium from an aqueous acidic sulfate process solution containing the same and a metal ion from the group consisting of nickel, cobalt and copper which comprises treating said aqueous solution at ambient pressure and at a temperature not exceeding the solution boiling point with an effective amount of an agent selected from the group consisting of metal hydrides, metal borohydrides, ammonia borane, and their derivatives to reduce a portion of said metal ion to metal in situ to produce a high surface area metal powder, removing at least a portion of said reduced metal from said solution and contacting a further portion of said aqueous solution containing hexavalent selenium therewith to reduce said selenium to a form separable from said solution by solid-liquid separation.

6. The process for removing hexavalent selenium from an aqueous sulfate process solution containing the same and a metal ion from the group consisting of nickel, cobalt and copper which comprises introducing into said solution an effective amount up to about 8% by weight of said metal ion in solution of an agent selected from the group consisting of metal hydrides, metal borohydrides, ammonia borane, and their derivatives at atmospheric pressures and at temperatures not exceeding the solution boiling point to reduce a portion of said metal ion to metal in situ and to reduce at least a portion of said hexavalent selenium, and thereafter separating said reduced selenium from said solution by solids-liquids separation.

7. The process in accordance with claim 6 wherein said agent is sodium borohydride stabilized with an effective amount of a base from the group consisting of sodium hydroxide and ammonia, said sodium borohydride being prepared as makeup water solution containing about 60 to about 250 grams per liter of $NaBH_4$ and said makeup solution being water-diluted with agitation to a concentration of about 6.4 to about 25 grams per liter of $NaBH_4$ prior to injection of the diluted solution into said metal ion containing stream.

8. The process in accordance with claim 7 wherein said diluted solution is injected into said metal ion containing stream with agitation.

9. The process in accordance with claim 8 wherein said agitation is provided by an in-line mixer.

10. The process in accordance with claim 7 wherein the $NaBH_4$ dosage is at least about 0.15 grams $NaBH_4$ per liter of said metal ion containing stream.

11. The process in accordance with claim 7 wherein said metal ion containing stream is an aqueous nickel sulfate solution containing about 10 to about 200 gpl nickel, up to 100 gpl cobalt, up to about 20 gpl iron, up to about 50 gpl copper, up to about 500 ppm zinc, up to about 500 ppm Se(VI), up to about 2000 ppm Se(IV), up to about 300 gpl ammonium sulfate, and up to about 50 gpl sodium.

12. The process in accordance with claim 11 wherein said solution has a pH between about 5.5 and 6.6.

13. The process in accordance with claim 7 wherein said metal ion containing stream is an aqueous copper sulfate stream containing about 10 to about 150 gpl copper, up to about 100 gpl nickel, up to about 20 gpl cobalt, up to about 500 ppm zinc, up to about 3000 ppm iron, up to about 500 ppm (Se(VI), up to about 2000 ppm Se(IV).

14. The process in accordance with claim 13 wherein said solution has a pH between about 5.5 and 6.6.

15. The process in accordance with claim 13 wherein said solution pH is at least about 5.5.

16. The process in accordance with claim 7 wherein said metal ion containing stream is an aqueous cobalt sulfate stream containing about 10 to about 200 grams per liter of cobalt, up to 100 grams per liter of nickel, up to about 20 grams per liter of iron, up to about 50 grams per liter of copper, up to about 500 ppm zinc, up to about 500 ppm selenium (VI), up to 2000 ppm selenium (IV) and having a pH measured at 20° C. of about 0 to 6.6.

* * * * *